Oct. 1, 1940.   J. VAN BUREN   2,216,525
SOAP CUTTING MACHINE
Filed March 11, 1939   8 Sheets-Sheet 1
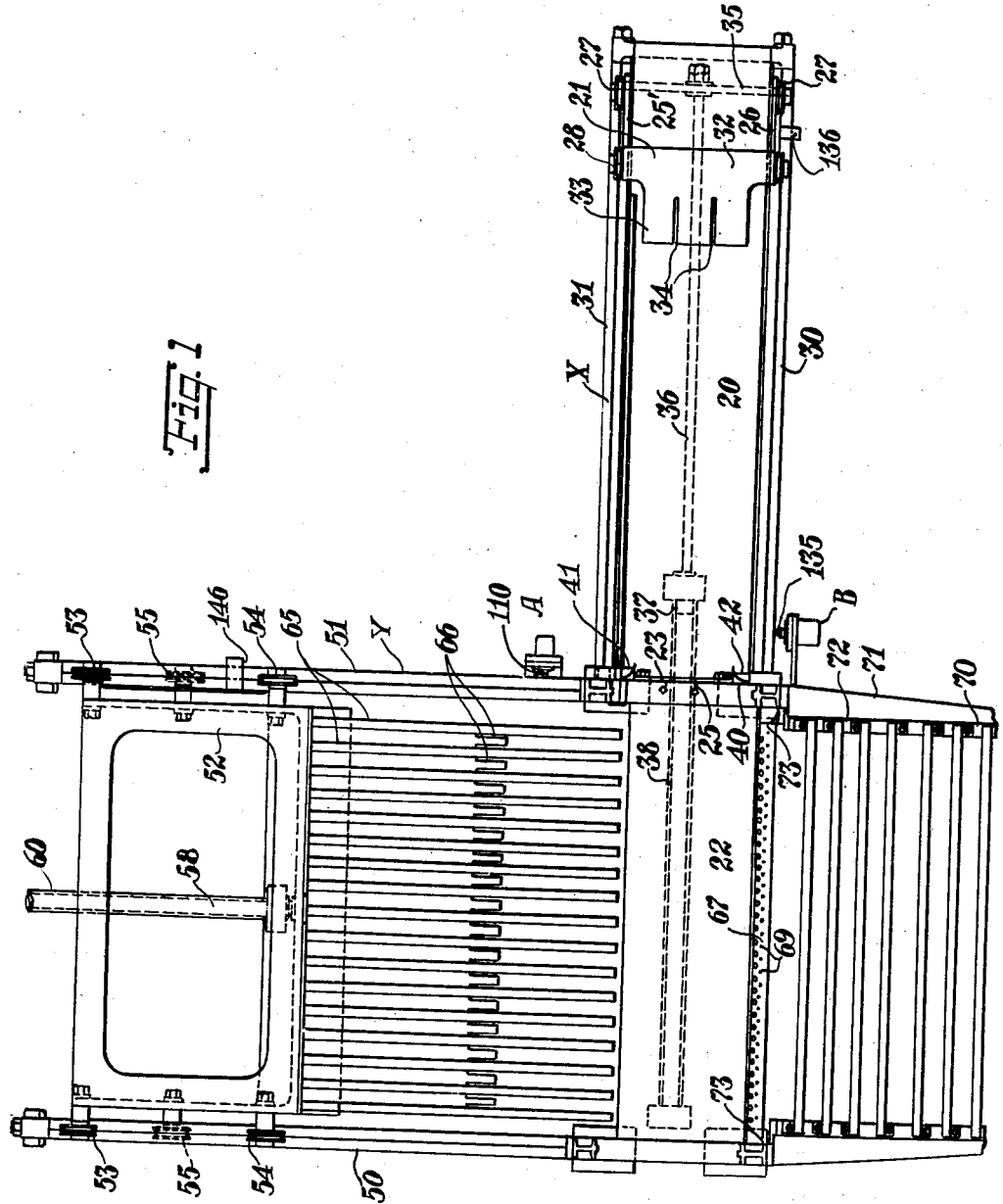
INVENTOR
John Van Buren
BY
Marshall & Hawley
ATTORNEYS

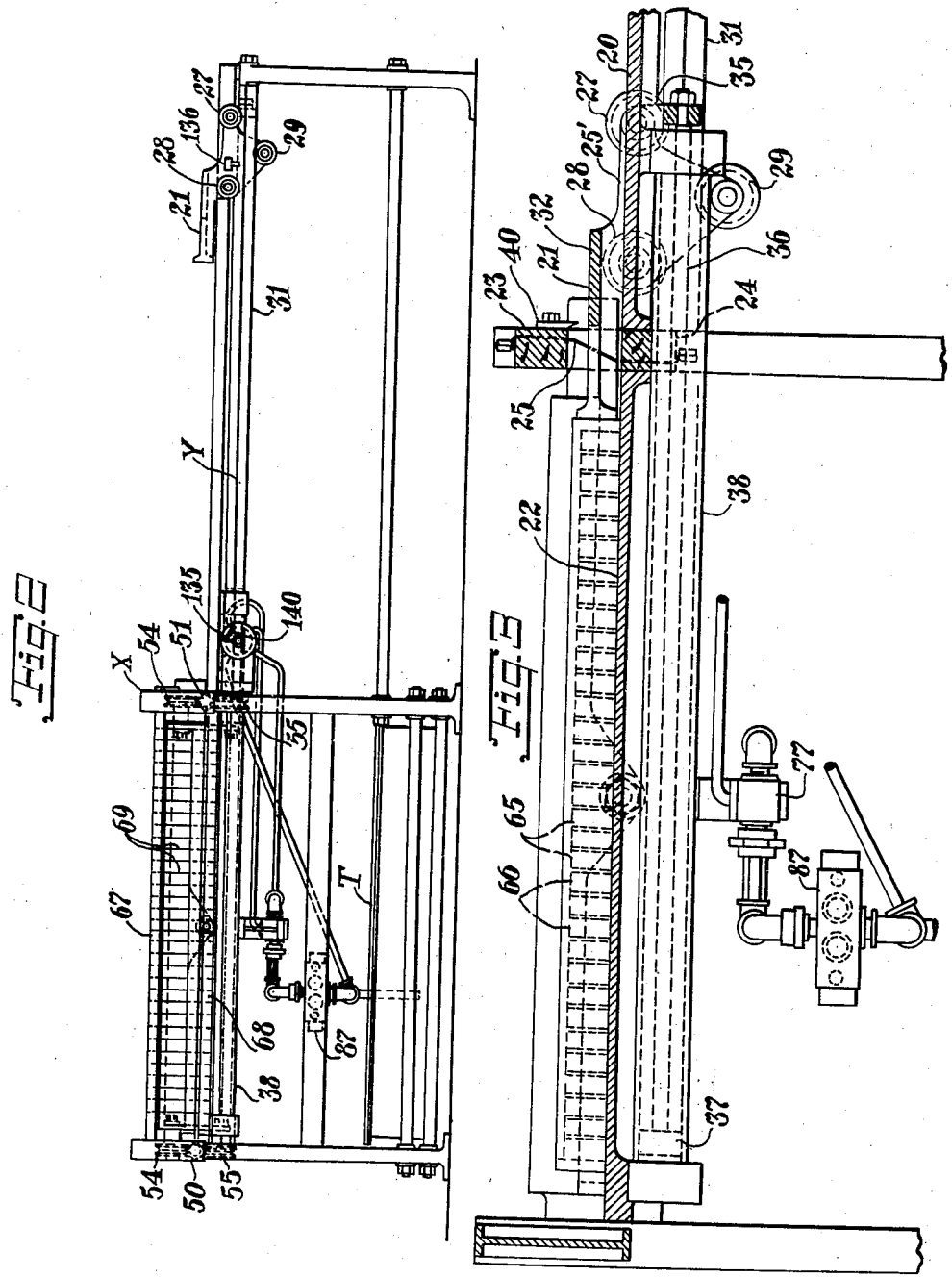

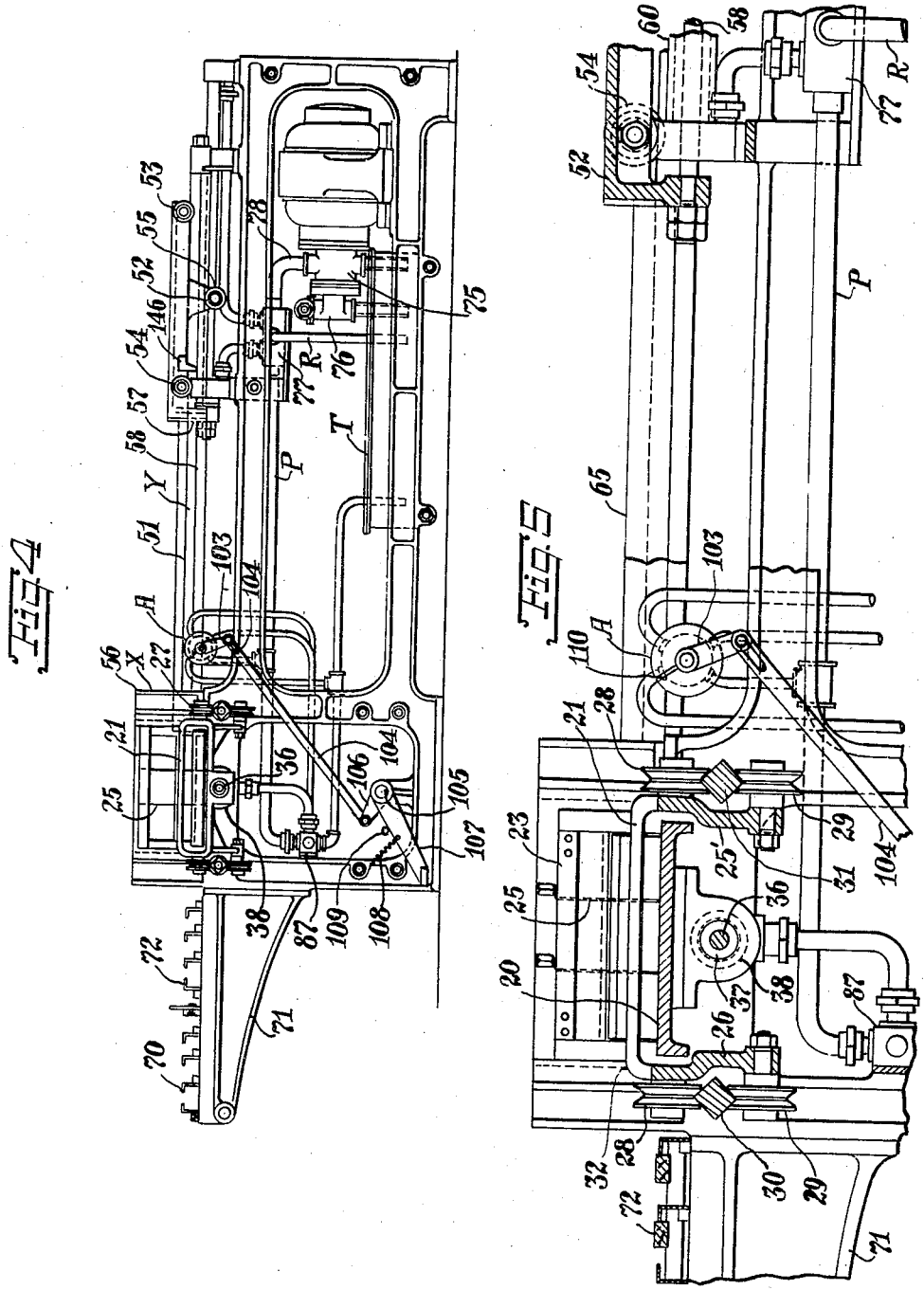

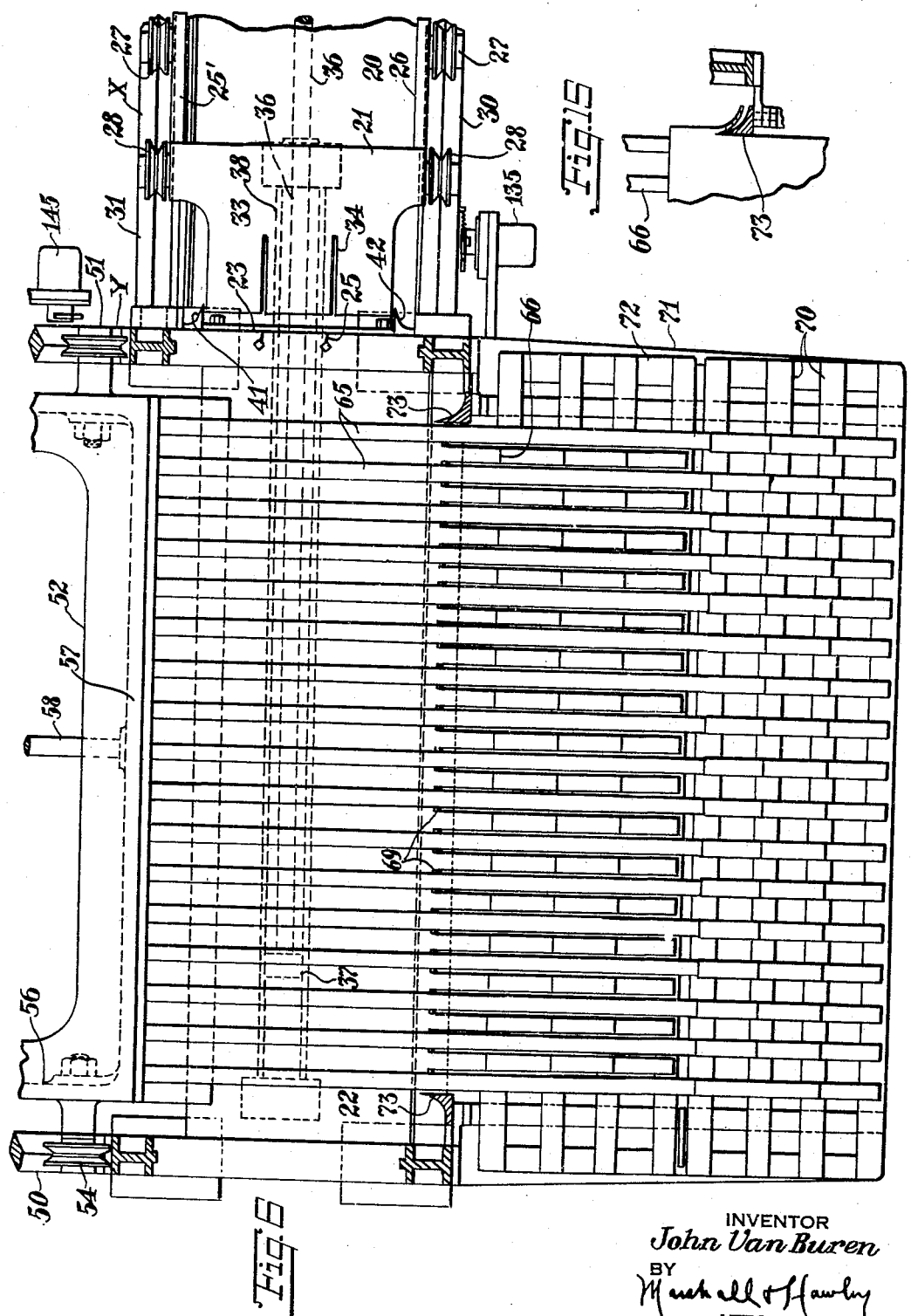

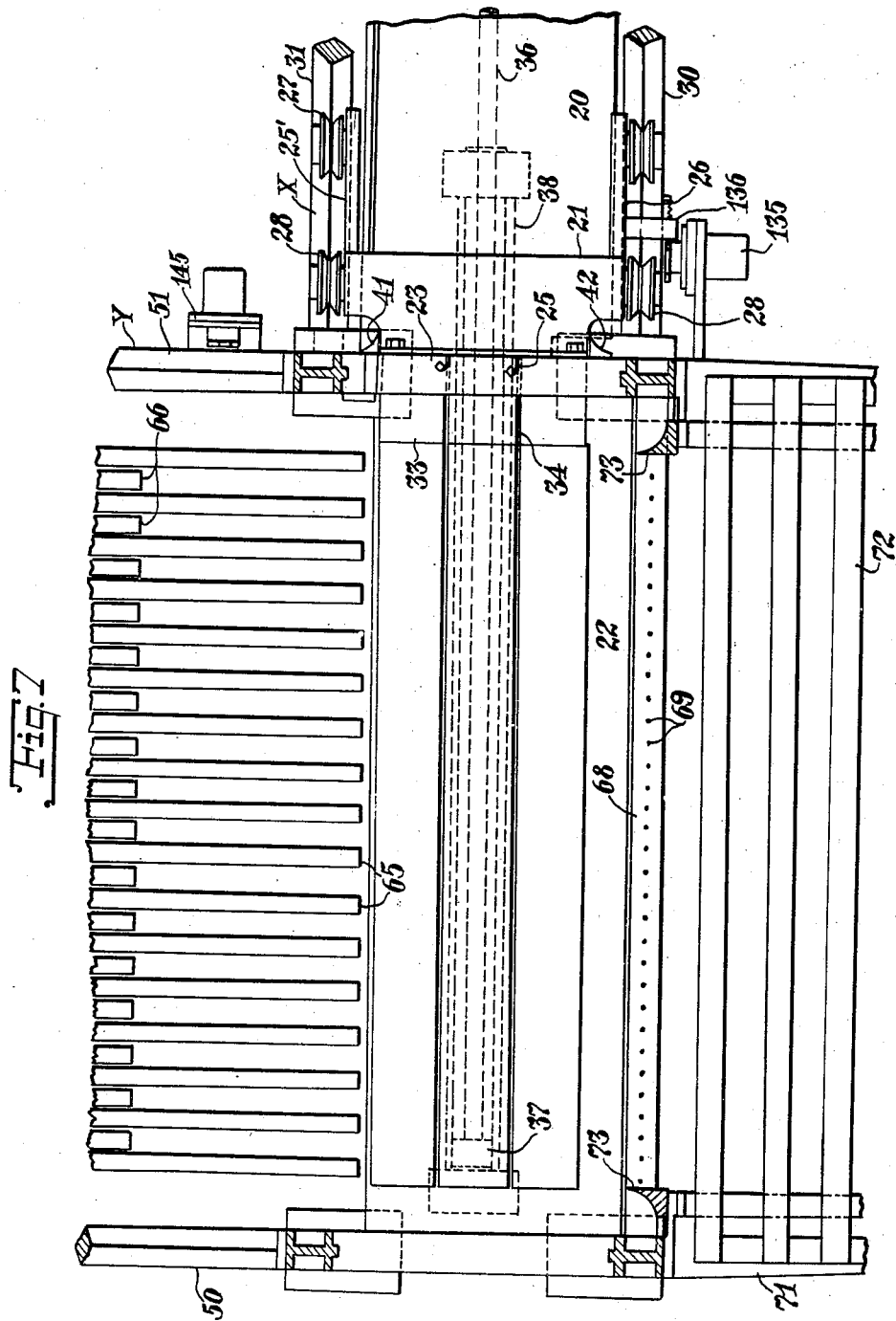

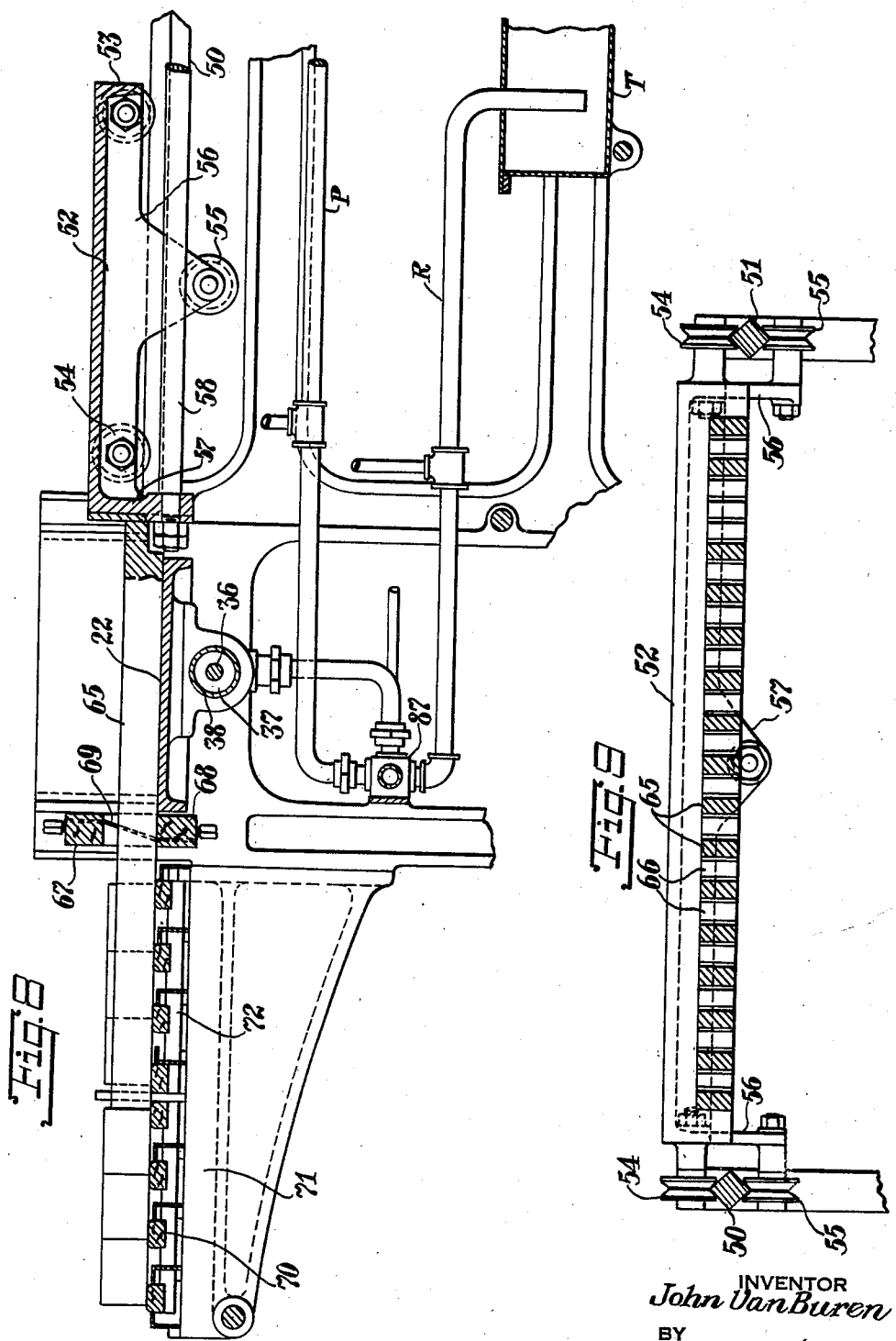

Oct. 1, 1940.  J. VAN BUREN  2,216,525
SOAP CUTTING MACHINE
Filed March 11, 1939  8 Sheets-Sheet 7
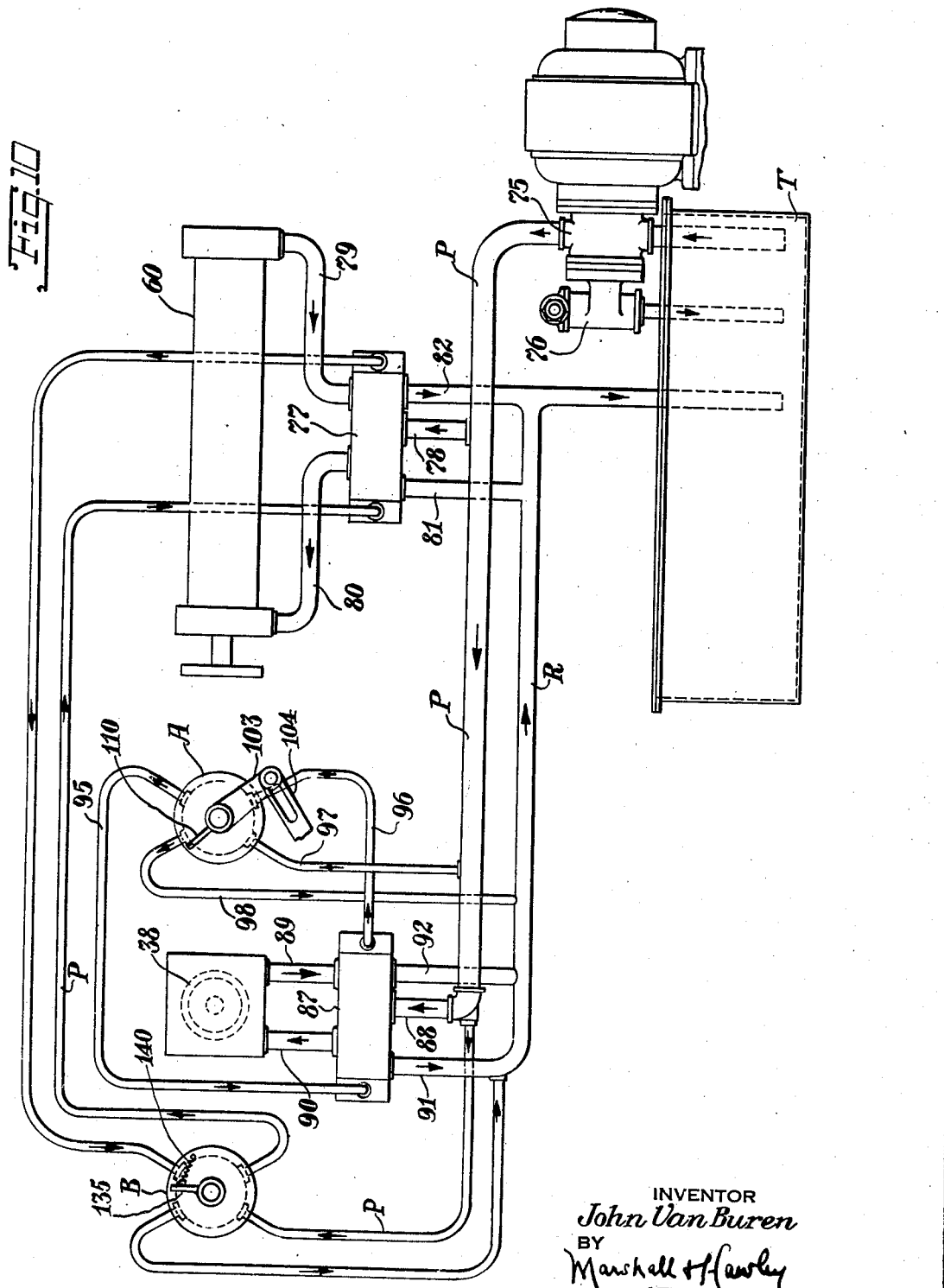
INVENTOR
John Van Buren
BY
Marshall H Hawley
ATTORNEYS Oct. 1, 1940.   J. VAN BUREN   2,216,525
SOAP CUTTING MACHINE
Filed March 11, 1939   8 Sheets-Sheet 8
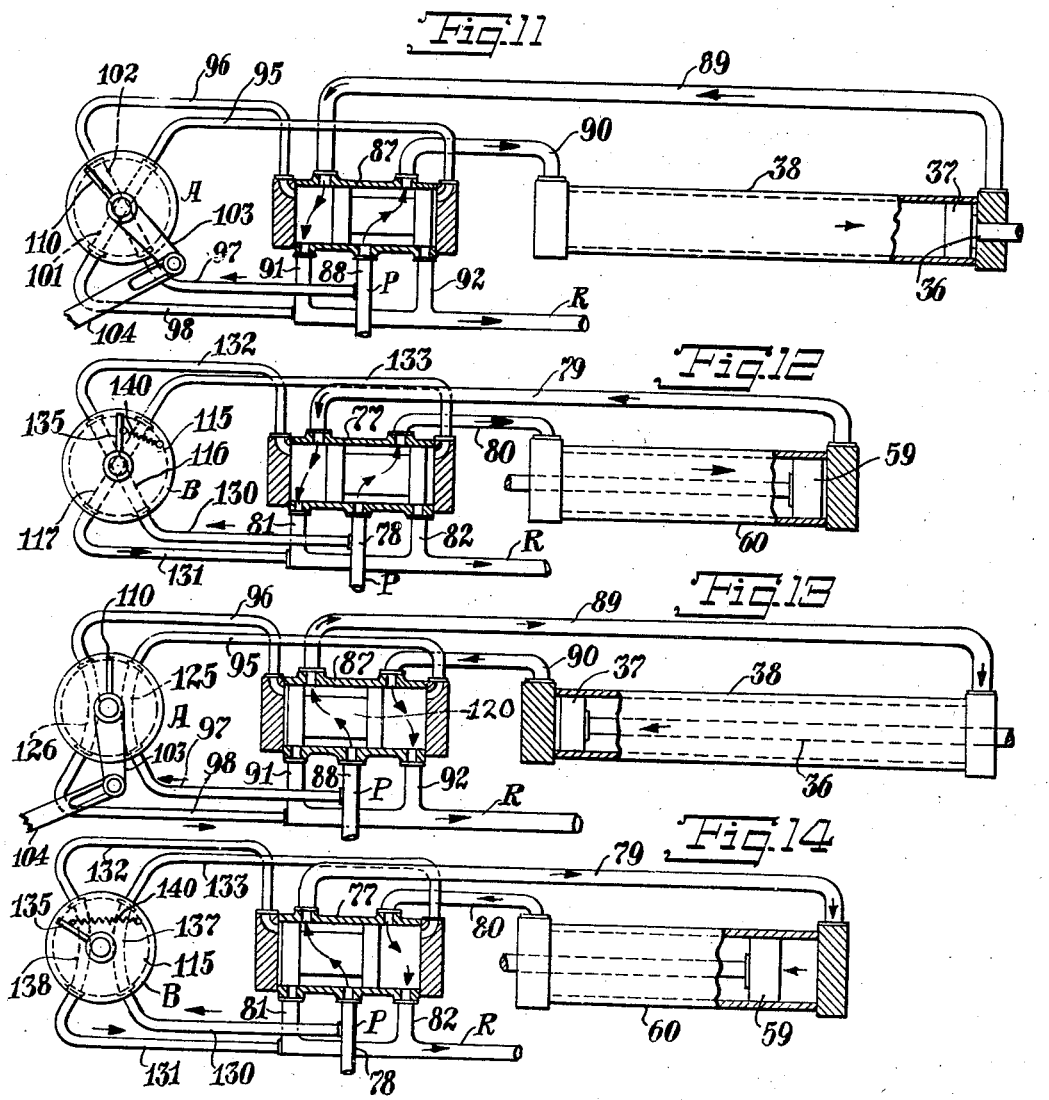

Patented Oct. 1, 1940

2,216,525

UNITED STATES PATENT OFFICE 2,216,525

SOAP CUTTING MACHINE

John Van Buren, Brooklyn, N. Y.

Application March 11, 1939, Serial No. 261,258

8 Claims. (Cl. 25—106)

This invention relates to soap cutting machines.

In machines of the class described, slabs of soap are first cut into strips and the strips are then cut into cakes.

This invention has for its salient object to provide a machine of the character described with simple and practical hydraulic actuating and control mechanism.

Further objects of the invention will appear from the following specification taken in connection with the drawings which form a part of this application, and in which Fig. 1 is a top plan view of the machine constructed in accordance with the invention;

Fig. 2 is an elevational view of the machine shown in Fig. 1;

Fig. 3 is an enlarged sectional elevation, partly broken away, showing a portion of the feed table for the slab feeding means and of the receiving table, the feeding means being shown at its innermost position of movement;

Fig. 4 is an elevational view of the machine shown in Fig. 1, this view being taken at right angles to Fig. 2;

Fig. 5 is an enlarged sectional elevation showing a part of the structure shown in Fig. 4 and particularly the details of the receiving table for the slab and the feeding mechanism for the second feeding movement which cuts the strips into cakes;

Fig. 6 is a top plan view on an enlarged scale showing the slab feeding means at its inner limit of movement and the second feeding means in its extreme position of feeding movement;

Fig. 7 is a top plan view of the central portion of the machine or table which receives the material after the slab has been cut into strips, this view showing the slab feeding means at its extreme end of the feeding movement and showing the position of the second feeding means before the feeding movement has started;

Fig. 8 is a detail sectional elevation taken substantially at right angles to Fig. 6;

Fig. 9 is a detail sectional elevation illustrating the second feed table and feed bars carried thereby;

Fig. 10 is a diagrammatic view illustrating the hydraulic connections for the hydraulic cylinders and the control mechanism therefor;

Fig. 11 is a diagrammatic view showing the main control valve and the four-way valve and hydraulic cylinder controlled thereby;

Fig. 12 is a view similar to Fig. 11 but showing the second control valve and the four-way valve and hydraulic cylinder controlled by the second valve;

Figs. 13 and 14 are views similar to Figs. 11 and 12 but illustrating different positions of operation of the valves and pistons; and Fig. 15 is a detail sectional elevation illustrating the shaving or paring knife which trims off the edges of the slab and the ends of the strips formed from the slab.

The invention briefly described consists of a machine for cutting slabs into strips and for cutting strips into cakes. The machine comprises a table for supporting the slab, feeding means for feeding the slab through suitable cutting means, such as wires, to a receiving table and feeding means for feeding the strips through suitable cutting means, as wires, whereby the strips are cut into cakes. The feeding means in both instances are actuated by hydraulic plungers and control means is provided for controlling the actuation of the plungers whereby the successive feeding movements will be carried out in the proper sequence.

Further details of the invention will appear from the following description.

From the showing in Fig. 1 it will be seen that the machine comprises two right angle sections X and Y. The portion X of the machine comprises a table 20 on which the slabs of soap or other material are manually placed and on which they are fed by a feeding carriage 21 to a table 22. Between the tables 20 and 22 there is disposed a frame comprising upper and lower bars 23 and 24 to which are secured wires 25 which cut the slab into three longitudinal strips as the slab is forced through the frame by the forward movement of the carriage 21.

The carriage 21 comprises side members 25' and 26, each side member having mounted thereon three rollers 27, 28 and 29. The rollers 27 and 28 are disposed with their axes in the same plane and the roller 29 is disposed at the bottom of the triangular side frame member. The carriage is guided in its reciprocation on square rods 30 and 31, the rollers 27, 28 being disposed on the top of the rod and the roller 29 being disposed below the the rod in each case. The carriage 21, as shown at 32, extends across and above the table 20 and has forwardly projecting therefrom a portion 33 having slots 34 which receive the wires 25 when the carriage moves to its extreme forward position in feeding the slab from the table 20 to the table 22.

The carriage 21 has a flange 35 extending downwardly from its rear end, to which is secured a plunger or piston rod 36 having mounted thereon a piston 37 disposed in a hydraulic cylinder 38. As the hydraulic fluid is admitted to the right hand end of the cylinder 38 viewing Figs. 1 and 3, the piston 37 moves to the left and draws the carriage 21 forwardly in its feeding movement. As the hydraulic fluid is admitted to the opposite end of the cylinder 38 the piston and carriage are moved in the opposite or retractive direction.

A scraper 40 is mounted on the bar 23 and extends downwardly therefrom and scrapes the upper surface of the slab in order to insure a smooth or even upper surface.

Side scrapers 41 and 42 are provided at the sides of the opening between the bars 23 and 24 to scrape the side edges of the slab as the slab is fed forwardly.

After the slab has been fed along the table 20 and has been cut longitudinally into strips by the wires 25, the longitudinal strips are then fed sidewise and are cut into cakes. The frame or section Y of the machine comprises square bars 50 and 51 on which is slidably mounted a carriage 52 having rollers 53 and 54 which rest on the tops of the bars and having rollers 55 disposed beneath the guide bars 50 or 51. The rollers 53, 54 and 55 are carried by the side frames 56 of the carriage 52. This carriage has a downwardly extending flange 57 at the front end thereof to which is secured a rod 58. This rod constitutes a piston rod and has mounted thereon a piston 59 which is disposed in a hydraulic cylinder 60. As the hydraulic fluid is admitted to the outer end of the cylinder 60, the piston and rod will move forwardly, thus causing the carriage 52 to feed the strips in a manner about to be described. On the other hand, when fluid is admitted to the other end of the cylinder 60 the piston rod and carriage will move in the opposite direction.

The carriage 52, as shown particularly in Fig. 1, has secured thereto and extending forwardly therefrom a plurality of spaced bars 65. Intermediate the bars 65, at a point between the front and rear ends thereof, are mounted bars 66. The purpose of these two sets of bars is clearly illustrated in Fig. 6. As the carriage and bars are fed forwardly they engage the strips disposed on the table 22 and feed them transversely through a frame comprising upper and lower bars 67 and 68, to which are secured wires 69. The wires 69 cut the strips into cakes and the cakes in line with the front ends of the bars 65 are fed on a tray 70 disposed on the outer portion of a shelf 71. The cakes in line with the bars 66 are fed on a tray 72 also disposed on the shelf 71, but nearer the table 22. The object of this is to provide spaces between the adjacent rows of cakes to facilitate drying.

Scrapers 73 are provided at the lateral or side edges of the wire frame to scrape off excess material and provide smooth surfaces on the outer rows of cakes.

The invention consists primarily in the hydraulic actuating and control means for the plunger rods which actuate the feed carriages. Attention is now directed to Figs. 10-14 inclusive. In Fig. 10 there is shown a tank or reservoir T for the hydraulic fluid, a hydraulic pump 75 for pumping the fluid from the tank into the pressure line P. The pump 75 is provided with a relief valve 76 through which fluid may pass back into the tank when the system is closed. The pressure line P is connected to a four-way valve 77 by a conduit 78 and the valve 77 is connected to the cylinder 60 by conduits 79 and 80. The valve 77 is also connected to the return line R of the system by conduits 81 and 82. The pressure line P is also connected to a four-way valve 87 by a conduit 88, this valve being connected to the cylinder 38 by conduits 89 and 90. The fluid is returned from the valve 87 through conduits 91 and 92 to the return line R.

The four-way valve 87 is connected to a control valve A by conduits 95 and 96 and the valve A is connected respectively to the pressure line P and the return line R by conduits 97 and 98.

The valve A has mounted therein a valve member 100 having transverse passages 101 and 102. The valve member 100 has secured thereto an arm 103 which, as shown in Fig. 4, is connected by a pin and slot connection to link 104 which is connected to a bell crank lever mounted on a fixed pivot 105 and comprising arms 106 and 107. The arm 107 forms a foot pedal engageable by the foot of the operator, and a spring 108 normally maintains the foot pedal in elevated position. A stop 109 limits the movement of the arm 107 under the action of the spring 108. The arm 103 also has extending upwardly therefrom a lug 110, the purpose of which will be hereinafter explained.

By referring to Figs. 11-14 inclusive, the operation of the valve A and four-way valve 87 and the parts controlled thereby will be clear. In Fig. 11 the piston 36 in the cylinder 38 is disposed at the outer end of its movement, the carriage 32 being disposed in the position shown in Fig. 2.

The valve member 100 is positioned in Fig. 11 with the transverse passages 101 and 102 in alinement with the conduits leading to the valve casing. The conduit 97 which communicates with the pressure line, communicates through passage 102 with conduit 96 which leads to the left hand end of the valve 87, thus causing the valve to be positioned at the right hand end of the casing of the valve 87, as shown in Fig. 11. The conduit 98 communicates through passage 101 with conduit 95 which leads to the right hand end of the valve casing of the valve 87. Thus, the left hand end of the casing receives the pressure fluid. The pressure fluid passes through the valve 87 and through conduit 90 into the left hand end of the cylinder 38. The right hand end of the cylinder communicates through the conduit 89 and valve 87 with the conduit 91 which discharges into the return line R.

A similar disposition of parts is illustrated n Fig. 12 which shows the valve B with its valve member 115 so disposed in the valve casing that the transverse passages 116 and 117 will be located in communication with the conduits leading to the valve casing. The piston 59 in the cylinder 60 is disposed at its outer extreme of movement or, in other words, in the position of rest, and the carriage 52 controlled thereby is disposed in the position shown in Fig. 4.

In Fig. 12 the pressure line 78 is connected to the valve 8 through a conduit 130 and the return line is connected to the valve B through a conduit 131. The left hand end of the valve 77 is connected to the valve B through a conduit 132 and the right hand end of the valve 77 is connected to the valve B through a conduit 133.

Referring again to Fig. 12, the pressure line 130 communicates through the valve passage 116 with conduit 132 and pressure fluid enters the left hand end of the valve 77 forcing the valve to the opposite end thereof. The other end of the valve 77 connects through conduit 133 and passage 117 with the return conduit 131 which is connected to the return line R.

The pressure fluid from the pressure line or conduit 78 passes through the valve 77 and conduit 80 into the right hand end of the cylinder 60 and the return fluid passes from the other end of the cylinder through the conduit 79 and valve 77 and conduit 81 to the return line R.

When the machine is to be started the operator presses down on the foot pedal 107, thus actuating the bell crank lever to pull the link 104 and shift the arm 103 from the position shown in Fig. 11 to the position shown in Fig. 13. This shifts the valve member 100 to a position in which the conduit 97 which connects with the pressure line P communicates through a valve conduit 125 with the conduit 95 which communicates with one end of the valve 87. This will cause the piston 120 in the valve 87 to be shifted to the position shown in Fig. 13. The pressure fluid which enters the valve 87 through the pressure conduit then passes through the conduit 89 to the outer end of the cylinder 38, thus causing the piston 37 to be shifted to the left in the cylinder effecting a forward movement of the carriage 21.

A conduit 126 in the casing of the valve A establishes communication between the conduit 96 which communicates with the left hand end of the cylinder 87 and the conduit 98 which communicates with the return line R. Furthermore, the conduit 90 at the left hand end of the cylinder 38 communicates through the valve 87 and with return conduit 92 which in turn connects to the return line R.

During the forward movement of the carriage 21 which pushes the slab through the wires 25 onto the table 22, the carriage 52 is held in its outer position.

When the carriage 21 reaches its extreme inner position of movement, as shown in Fig. 3, the arm 103 is shifted back to its initial position and the valve B is actuated or moved to a position in which the piston 59 is moved from the right hand end of the cylinder 60 toward the left hand end, thus actuating the carriage 52. This is accomplished in the following manner: The valve B has secured to the spindle thereof a lug 135 which is disposed in the path of movement of a lug 136 carried by the carriage 32. Thus, as the carriage reaches the end of its forward end lug, 136 engages lug 135 and shifts the valve B from the position shown in Fig. 12 to the position shown in Fig. 14. In this latter position passages 137 and 138 in the valve B communicate with the conduits 130 and 131 respectively, and connect these conduits with conduits 133 and 132. Thus, the pressure line is connected to the right hand end of the cylinder 77 and shifts the valve therein to the left to the position shown in Fig. 14. When this has been done the main pressure line P communicates through conduit 78 and valve 77 with the conduit 79 which leads to the outer end of the cylinder 60, thus causing the piston in the cylinder to move to the left. The other end of the cylinder is connected through conduit 80 and valve 77 to the return conduit 82. The lug 135 is normally disposed in the position shown in Fig. 12, being held in this position under the actuation of a spring 140. Thus, as long as the carriage 21 is disposed in its innermost position the valve B will be held in the position shown in Fig. 14.

When the carriage 52 reaches its innermost position of feeding movement, means is provided for shifting the valve A from the position shown in Fig. 13 to the position shown in Fig. 11. This is accomplished by means of the lug 110 mounted on the spindle of the valve A and positioned for engagement by a lug 146 carried by the carriage 52. When the lug 146 engages the lug 145 the valve A is returned from the position shown in Fig. 13 to the position shown in Fig. 11, thus causing the piston 37 to be again moved to the right hand end of the cylinder 38 and causing the carriage 21 to be retracted to its initial position.

From the foregoing description it will be seen that when the valve A is actuated by the pedal 107 the valve will be shifted from the position shown in Fig. 11 to the position shown in Fig. 13, causing the carriage 21 to move forward in its feeding movement in a manner hereinafter described. After the carriage has reached its inner limit of movement, the lug 136 will engage lug 135 on valve B and cause this valve to be shifted from the position shown in Fig. 12 to the position shown in Fig. 14. This in turn will cause the piston 59 in the cylinder 60 to move forward, actuating the carriage 52 and the feed bars mounted thereon. After the carriage 52 has completed its feeding movement the lug 146 will engage lug 110 on the valve A, returning this valve to the position shown in Fig. 11 and causing the carriage 52 to be retracted to its initial position.

Although one specific embodiment of the invention has been particularly shown and described, it will be understood that the invention is capable of modification and that changes in the construction and in the arrangement of the various cooperating parts may be made without departing from the spirit and scope of the invention, as expressed in the following claims.

What I claim is:

1. A soap cutting machine comprising means for feeding a slab of soap, means for cutting the slab into strips as it is fed, means for feeding said strips laterally, means for cutting the strips into cakes as they are fed laterally, actuating means for each of said feeding means, means controlled by the slab feeding means for setting said strip feeding actuating means in operation, and means controlled by said strip feeding means for causing both said actuating means to return both said feeding means to their initial positions.

2. A soap cutting machine comprising means for feeding a slab of soap, means for cutting the slab into strips, as it is fed, means for feeding said strips laterally, means for cutting the strips into cakes as they are fed laterally, hydraulic actuating means for each of said feeding means, hydraulic means controlled by the slab feeding means for setting said strip feeding actuating means in operation, and means controlled by said strip feeding means for causing both said actuating means to return both said feeding means to their initial positions.

3. A soap cutting machine comprising means for feeding a slab of soap, means for cutting the slab into strips as it is fed, means for feeding said strips laterally, means for cutting the strips into cakes as they are fed laterally, hydraulic actuating means for each of said feeding means, hydraulic means controlled by the slab feeding means for setting said strip feeding actuating means in operation, and hydraulic means controlled by said strip feeding means for causing both said actuating means to return both said feeding means to their initial positions.

4. A soap cutting machine comprising means for feeding a slab of soap, cutting means disposed in the path of movement of the slab for cutting the slab into strips, means for feeding the strips laterally, means disposed in the path of movement of the strips for cutting the strips into cakes, hydraulic means for actuating said slab feeding means, hydraulic means for actuating said strip feeding means, control means for setting said slab feeding hydraulic means in operation, and means controlled by the slab feeding means for setting the hydraulic actuating means for the strip feed in operation.

5. A soap cutting machine comprising means for feeding a slab of soap, cutting means disposed in the path of movement of the slab for cutting the slab into strips, means for feeding the strips laterally, means disposed in the path of movement of the strips for cutting the strips into cakes, hydraulic means for actuating said slab feeding means, hydraulic means for actuating said strip feeding means, hydraulic control means for setting said slab feeding hydraulic means in operation, and means controlled by the slab feeding means for setting the hydraulic actuating means for the strip feed in operation.

6. A soap cutting machine comprising means for feeding a slab of soap, cutting means disposed in the path of movement of the slab for cutting the slab into strips, means for feeding the strips laterally, means disposed in the path of movement of the strips for cutting the strips into cakes, hydraulic means for actuating said slab feeding means, hydraulic means for actuating said strip feeding means, hydraulic control means for setting said slab feeding hydraulic means in operation, and hydraulic means controlled by the slab feeding means for setting the hydraulic actuating means for the strip feed in operation.

7. A soap cutting machine comprising means for feeding a slab of soap, cutting means disposed in the path of movement of the slab for cutting the slab into strips, means for feeding the strips laterally, means disposed in the path of movement of the strips for cutting the strips into cakes, hydraulic means for actuating said slab feeding means, hydraulic means for actuating said strip feeding means, manually operable, hydraulic control means for setting said slab feeding hydraulic means in operation, and means automatically controlled by the slab feeding means for setting the hydraulic actuating means for the strip feed in operation.

8. A soap cutting machine comprising a cylinder, a plunger having a piston in said cylinder, hydraulic means for actuating said plunger, including a valve for controlling the admission of fluid to said cylinder to cause said plunger to move forwardly or backwardly in said cylinder, means connected to said plunger for feeding a slab of soap, cutting means in the path of movement of said slab, for cutting the slab into strips, means for feeding said strips laterally and including a cylinder, plunger and hydraulic control means for controlling the admission of fluid to said cylinder to cause the feeding means to feed the strips and to retract said feeding means, cutting means in the path of movement of the strips to cut the strips into cakes, means connected to the slab feeding means for operating the strip feed control means to cause said fluid to cause the strip feeding plunger to operate the strip feeding means, and means connected to the strip feeding means to cause the slab feeding plunger and strip feeding plunger to be retracted, thus returning both said feeding means to their initial positions.

JOHN VAN BUREN.